United States Patent
Seryi

(10) Patent No.: US 8,919,705 B2
(45) Date of Patent: Dec. 30, 2014

(54) FASTENING DEVICE HAVING A COMPENSATING RAIL FOR TOLERANCE COMPENSATION

(75) Inventor: Artem Seryi, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 609 days.

(21) Appl. No.: 13/227,061

(22) Filed: Sep. 7, 2011

(65) Prior Publication Data
US 2012/0056046 A1  Mar. 8, 2012

(30) Foreign Application Priority Data
Sep. 8, 2010  (DE) .................. 10 2010 044 665

(51) Int. Cl.
F16L 3/00 (2006.01)
F16B 21/08 (2006.01)
F16B 21/07 (2006.01)
F16L 3/01 (2006.01)

(52) U.S. Cl.
CPC .......... F16B 21/086 (2013.01); F16B 21/073 (2013.01); F16L 3/012 (2013.01)
USPC ...... 248/73; 248/49; 248/288.31; 248/297.21

(58) Field of Classification Search
USPC .............. 248/49, 51, 56, 71, 73, 74.5, 229.16, 248/229.17, 288.31, 295.11, 296.1, 298.1, 248/297.21
See application file for complete search history.

(56) References Cited

U.S. PATENT DOCUMENTS

| | | | | |
|---|---|---|---|---|
| 5,172,878 A | * | 12/1992 | Lederman | 248/73 |
| 5,233,881 A | * | 8/1993 | Sayen et al. | 74/502.4 |
| 5,271,651 A | * | 12/1993 | Blatt et al. | 269/71 |
| 5,934,733 A | | 8/1999 | Manwaring | |
| 2005/0151040 A1 | * | 7/2005 | Hsu | 248/214 |
| 2007/0057124 A1 | | 3/2007 | Kwilosz | |
| 2009/0294600 A1 | * | 12/2009 | Dodge | 248/73 |
| 2009/0322075 A1 | | 12/2009 | Marschall et al. | |

FOREIGN PATENT DOCUMENTS

| | | |
|---|---|---|
| DE | 1828568 U | 3/1961 |
| DE | 2921884 A1 | 12/1980 |
| DE | 8703304 U1 | 6/1987 |
| DE | 102004032951 A1 | 1/2006 |
| DE | 102005011485 A1 | 9/2006 |
| DE | 102006003772 A1 | 7/2007 |
| DE | 102006061112 A1 | 6/2008 |
| GB | 2052165 A | 1/1984 |

(Continued)

OTHER PUBLICATIONS

British Patent Office, British Search Report for Application No. 1113290.9, dated Oct. 31, 2011.

*Primary Examiner* — Gwendolyn W Baxter
(74) *Attorney, Agent, or Firm* — Ingrassia Fisher & Lorenz, P.C.

(57) ABSTRACT

A fastening device for fixing lines in the engine compartment of a motor vehicle, in particular lines for the air conditioner. Fastening recesses are provided in the engine compartment, on which the fastening device can be anchored. The fastening device has a clip base for this purpose. A clip head is used for fastening the fastening device to the line. At least one of the fastening clips is situated so it is longitudinally movable on the compensating rail, so that the fastening device can be adapted to the installation situation.

11 Claims, 4 Drawing Sheets

(56) References Cited

FOREIGN PATENT DOCUMENTS

| | | | | |
|---|---|---|---|---|
| GB | 2483534 A | * | 3/2012 | ............... F16L 3/13 |
| JP | 8163750 A | | 6/1996 | |
| JP | 9046865 A | | 2/1997 | |
| JP | 9294322 A | | 11/1997 | |
| JP | 2005287276 A | | 10/2005 | |

* cited by examiner

FASTENING DEVICE HAVING A COMPENSATING RAIL FOR TOLERANCE COMPENSATION

CROSS-REFERENCE TO RELATED APPLICATION

This application claims priority to German Patent Application No. 102010044665.3, filed Sep. 8, 2010, which is incorporated herein by reference in its entirety.

TECHNICAL FIELD

The technical field relates to a fastening device for lines in the engine compartment of a motor vehicle.

BACKGROUND

Fastening devices according to the species are used to fasten lines of an air conditioner in the engine compartment. The lines may be aluminum or steel pipes. A clip base of the fastening device can be situated on a selected fastening point in the engine compartment. A clip head, on which the line can be fastened, typically extends from the clip base, the clip head being integrally and rigidly connected thereto.

In order to be adapted to the frequently constricted space conditions in the engine compartment, excessively complicated line geometries are sometimes required. Problems may occur with the fastening devices in the event of deviations of the line geometries or the fastening points. On the one hand, not every line is like the others, on the other hand, the fastening points in the engine compartment, which may be formed by simple fastening recesses or bolts on components or parts of the vehicle body, are also not always at the same point. During the installation, the lines are nonetheless pressed into the fastening devices provided for them if possible. The lines may thus be under tension and spring out of the clip head in operation. Rattling sounds may thus occur, or in the worst case the lines themselves or surrounding components may be damaged.

At least one problem to be solved therefore comprises providing a simple fastening device, using which the above-described problems can be avoided. In addition, other problems, desirable features and characteristics will become apparent from the subsequent summary and detailed description, and the appended claims, taken in conjunction with the accompanying drawings and this background.

SUMMARY

According to a first embodiment, a fastening device is provided for lines in the engine compartment of a motor vehicle, having two fastening clips, one of which has a clip base for attachment in the engine compartment and the other of which has a clip head for attachment to a line, the fastening device having a compensating rail, in particular an oblong compensating rail, on which at least one of the fastening clips is situated so it is longitudinally movable.

For fastening a line, the clip base can be fastened on a fastening point provided for this purpose in the engine compartment. The compensating rail having the clip head situated thereon can then be pivoted in relation to the line so that the line no longer has to be directly axially over the fastening point. The line can then be fastened to the clip head. Greater deviations of the line geometries or the positions of the fastening points can thus be effectively compensated for when fastening a line in the engine compartment. According to an embodiment, at least one of the fastening clips has a ball head, which is enclosed by an area in the compensating rail in such a way that the fastening clip is rotatable.

According to a further embodiment, the area enclosing the ball head is formed from surfaces angled to one another, with which the ball head is in contact, the surfaces exerting a force in the direction of the ball head, so that friction surfaces are formed between the ball head and the surfaces of the area. In this way, the fastening clips can only be rotated under force action, whereby the line is held in position with a certain stability.

According to an embodiment of the invention, the area enclosing the ball head is extended in one direction, so that a trough is formed, in which the ball head having the fastening clip situated thereon is longitudinally movable. In this way, the rotatability and the longitudinal mobility can be implemented by comparatively simple means. It is ensured by the above-described friction surfaces that the longitudinal mobility can also only occur under force action, so that the line cannot detach due to vibrations in driving operation.

According to a further embodiment, the first fastening clip, for positioning on a fastening point in the engine compartment implemented as an undercut fastening recess, has a spreading element, which engages in the undercut fastening recess under pressure action on the clip base.

In a further embodiment, the fastening recess can be designed so that the clip base cannot be rotated therein, for example, in that the undercut area in which the spreading element engages encloses the spreading element in a formfitting way on its periphery. The rotatability of the fastening device is ensured via the ball head. This measure has the advantage that the clip head does not hang loosely in the fastening recess. The compensating rail is accordingly held in a desired position with a certain stability.

According to a further embodiment, the clip head is formed from an essentially U-shaped clamp having an inwardly pointing enclosure area on its ends, so that the line can engage in the U-shaped clamp of the clip head in the event of pressure action. A simple installation capability is thus ensured.

According to a further embodiment, the compensating rail is flexible, so that it can be bent into a desired shape in the engine compartment. In this way, not only an offset in the plane around the clip base, but rather also orthogonally thereto in a vertical axis can be compensated for. The attachment to the line can be performed in that the compensating rail is bent so that the clip head can come into contact with the line and/or can be fastened thereto.

According to an embodiment, both fastening clips are situated on the compensating rail so they are rotatable. The compensating rail can thus be pivoted around the fastening clip, for example, the clip base, which is situated so it is rotatable on the compensating rail toward the line. The clip head is subsequently drawn into position along the compensating rail and rotated so that the line can engage in the clip head. It is fundamentally also conceivable that the clip head is only mounted so it is rotatable and the clip base is situated so it is longitudinally movable and rotatable on the compensating rail.

According to an alternative embodiment, both fastening clips are situated so they are longitudinally movable on the compensating rail. An additional degree of freedom is thus obtained, whereby the installation of the fastening device or the fastening of the line in the engine compartment is further simplified.

Furthermore, according to an embodiment, multiple clip heads may be situated on the compensating rail, so that one line can be held using multiple clip heads or multiple lines can be held using one fastening device.

The fastening device is preferably used to fasten lines of an air-conditioning system or to lock them fixed in place in the engine compartment.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
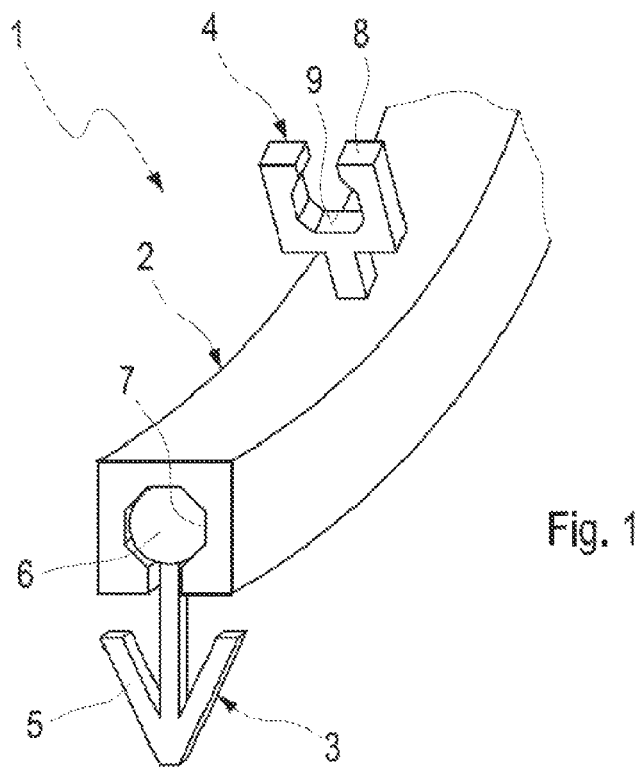
FIG. 1 shows a partial section of a compensating rail having a rotatable clip head and a longitudinally movable and rotatable clip base.

FIG. 1 schematically shows a fastening device 1 having a compensating rail 2 and two fastening clips, namely a clip base 3 and a clip head 4. The clip base 3 has an essentially arrow-shaped spreading element 5, which can be compressed under pressure action. The clip base 3 can thus be anchored in an undercut fastening recess (not shown), in that it is pressed therein, the spreading element 5 being compressed and relaxing in an undercut area after overcoming the fastening recess. The undercut area can be designed so that it is adapted to the shape of the spreading element, so that the clip base 3 can be anchored rotationally fixed in the fastening recess. A formfitting connection is thus produced between a component and the clip base 3.

On its end facing away from the spreading element 5, the clip base 3 has a ball head 6, which is enclosed by an octagonal area on the compensating rail 2, which is open in the direction of the spreading element 5. The area is extended in the direction of a longitudinal axis of the compensating rail 2, so that a trough 7 is formed, in which the clip base 3 can be moved longitudinally. In addition, the clip base 3 can be rotated around an axis in the trough 7.

A clip head 4, which has an essentially U-shaped, expandable clamp 8 having an enclosure area on its upper end for fastening to a line (not shown), is situated on the side of the compensating rail 2 facing away from the trough 7. The U-shaped clamp 8 has on its inner side holding surfaces 9, which are angled to one another, and which are in contact with the line in the installed state. The clip head 4 is designed according to the diameter of the lines to be attached. The lines can be the lines of an air conditioner in the motor vehicle. They may be formed from aluminum or steel pipes and have a diameter of 5 mm to 25 mm. The U-shaped clamp 8 is preferably only large enough that only slight forces may be exerted on the line in the radial direction, so that the line can be rotated comparatively easily in the clip head 4. It can thus be ensured that the line is not under tension in the installed state in such a way that it is situated twisted in the clip head 4.

Surfaces 10, which are angled to one another, and which enclose the ball head 6, are also implemented in the trough 7. The surfaces 10 angled to one another in the trough 7 are preferably designed so that they exert a force in the direction of the center point of the ball head 6. This can be ensured in that the ball head 6 is implemented as 0.5% to 4% larger than a ball head 6 fitting ideally in the trough 7, so that a slight press fit results. The ball head 6 can thus only be rotated and displaced under a certain force action. In this way, the fastening device 1 is stabilized and does not detach from the set location in operation, whereby rattling noises could occur.

To fasten a line in the engine compartment of a motor vehicle, the clip base 3 is first situated in the above-described way on the undercut fastening recess. The compensating rail 2 is subsequently pivoted toward the line and optionally also moved along the trough 7 until the clip head 4 is congruent with the line. The line can now be pressed into the U-shaped clamp 8 of the clip head 4. As indicated in the figures by the upwardly bent compensating rail 2, the line does not have to be situated directly in a plane around the clip base 3, but rather can also run offset in the direction of a vertical axis running orthogonally to the plane. The compensating rail 2 is preferably sufficiently stiff for this purpose so that it can be manually bent, so that it can be adapted to the given conditions during the installation. The compensating rail 2 is preferably bar stock, so that an installer only has to cut off a piece in the desired length from the bar stock during the installation of the fastening device 1. The compensating rail 2 has an essentially rectangular cross-section and can be formed from an extruded aluminum or plastic.

Figure 2:
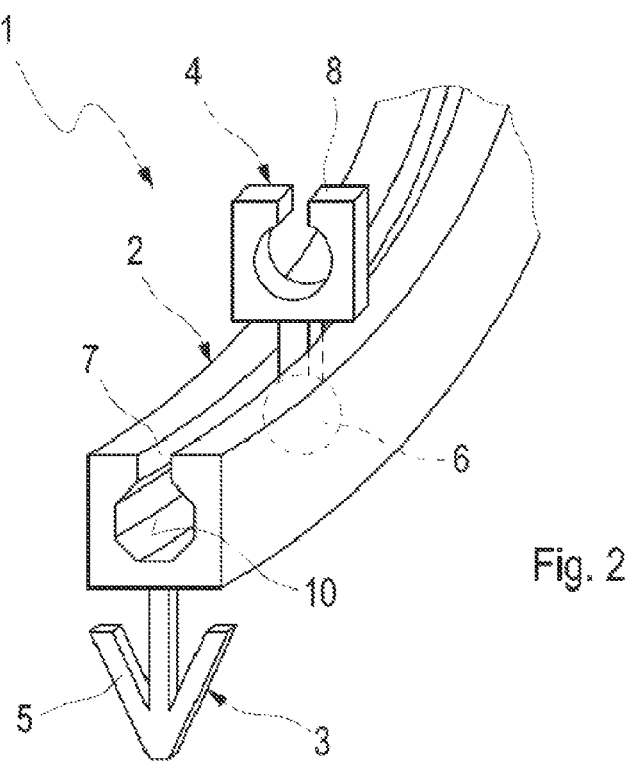
FIG. 2 shows a partial section of a compensating rail having a rotatable clip head and a longitudinally movable and rotatable clip base.

A fastening device is shown in FIG. 2, in which the clip head 4 has a ball head 6, which is situated so it is longitudinally movable in a trough 7 in the compensating rail 2. The clip base 3 is optionally situated so it is rotatable on the compensating rail 2, but, alternatively thereto, it can also be situated so it is rotatable in a corresponding rotationally-symmetric fastening recess. The U-shaped clamp 8 is round on the inner side facing toward the line and is adapted to the external shape of the line. In the embodiment shown in FIG. 2, the clip head 4 can be placed so it is congruent with the line to be fastened during the installation, in that it is moved and rotated in the trough 7 along the compensating rail 2.

Figure 3:
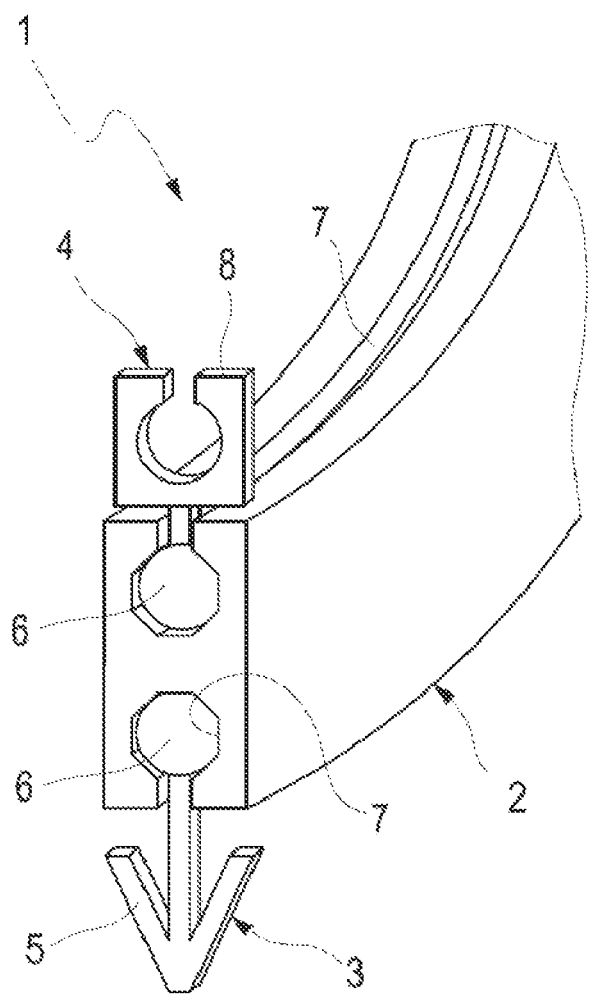
FIG. 3 shows a partial section of a compensating rail, on which both the clip base and also the clip head are situated so they are longitudinally movable and rotatable.

An embodiment is shown in FIG. 3, in which both the clip head 4 and also the clip base 3 are each situated so they are longitudinally movable in a trough 7. The troughs 7 are situated on faces of the compensating rail 2 which face away from one another. By situating each fastening clip in a separate trough 7, additional degrees of freedom are obtained. This can be helpful during the installation, since the compensating rail 2 can be displaced independently of the fastening clips. Multiple fastening clips can also be situated on one compensating rail 2. For example, one line can be held using multiple clip heads 4 or multiple lines can be held using one compensating rail 2. Furthermore, for example, multiple clip bases 3 can be situated on one compensating rail 2.

The fastening recesses can be situated on components in the engine compartment, for example, on a radiator of an internal combustion engine, a condenser for refrigerant, a radiator grille holder, or a longitudinal girder.

In addition to their transport function, the lines sometimes also fulfill functions which are related to the cooling circuit, for example, the complete condensation of refrigerant. For this purpose, specific distances must be maintained from adjacent components, some of which emit heat. Using the fastening device described here, more complex line geometries may be implemented, in which the lines may be spaced apart not only in the plane around the fastening point, but rather also in the vertical axis over the fastening point.

Figure 4:
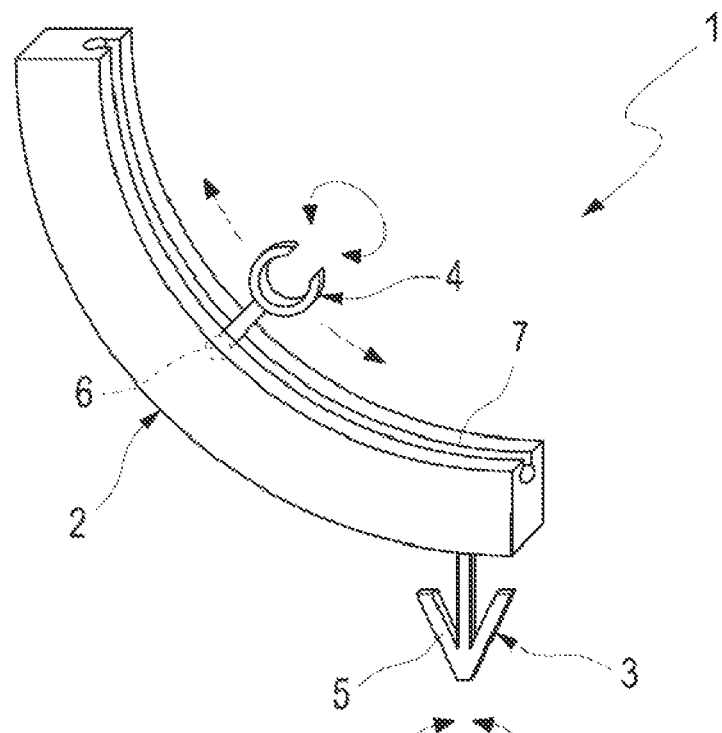
FIG. 4a shows a compensating rail in the form of a quarter circle, on which a rotatable clip base and a rotatable and longitudinally movable clip head are situated.
FIG. 4b shows a compensating rail as in FIG. 4a), in which the clip base is also longitudinally movable.
FIG. 4c shows a semicircular compensating rail having clip base and clip head situated thereon so they are rotatable and longitudinally movable.
Figure 4:
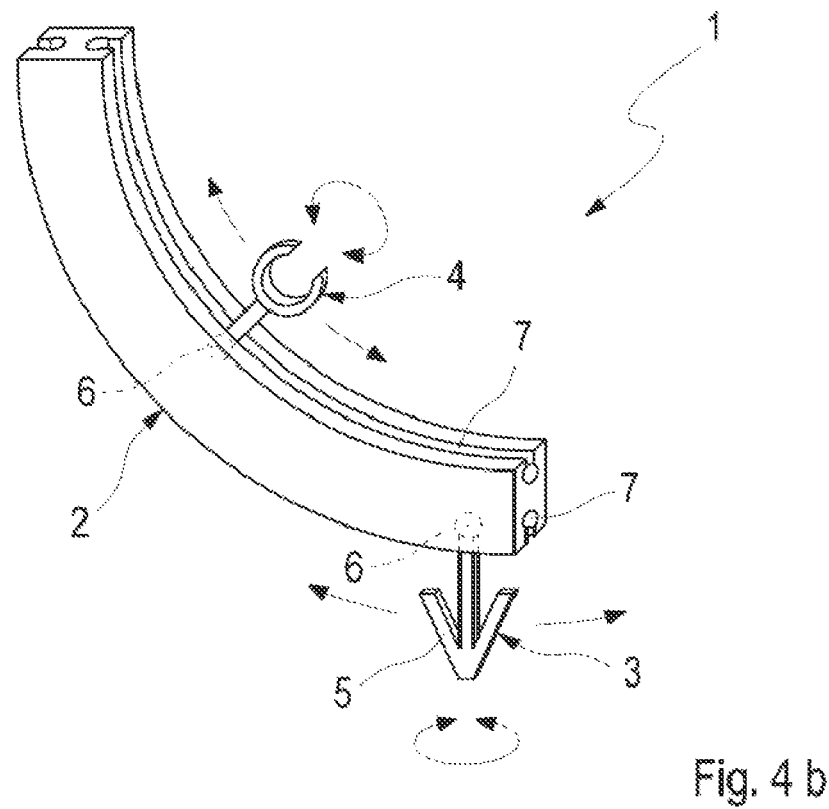
Figure 4:
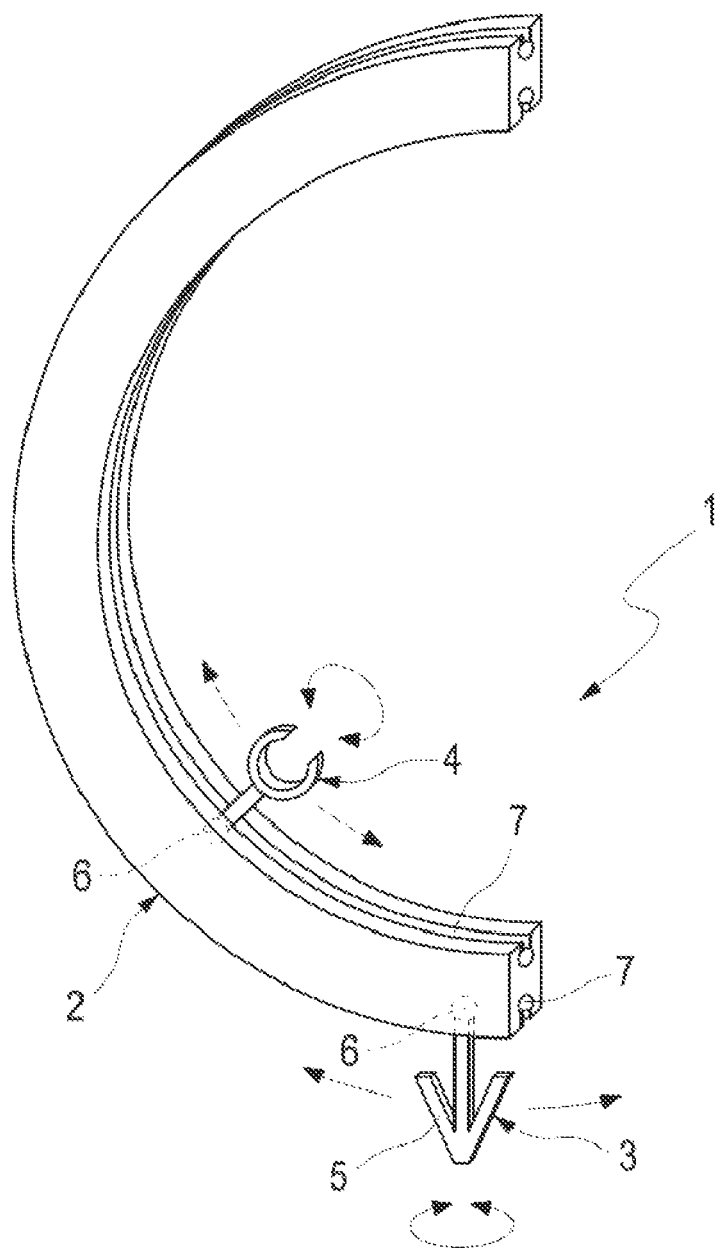

Three fastening device 1 is shown in perspective in FIG. 4 to illustrate the degrees of freedom of the fastening clips and the possible shapes of the compensating rail 2. The degrees of freedom are symbolized by arrows. FIG. 4*a* shows a compensating rail 2 in the form of a quarter circle having a rotatable clip base 3 situated thereon. A trough 7 is situated on the compensating rail, in which the clip head 4 is situated so it is longitudinally movable and rotatable. FIG. 4*b* shows a compensating rail having two troughs 7 and corresponding rotatable and longitudinally movable fastening clips. FIG. 4*c*) shows a semicircular compensating rail 2 having fastening clips situated thereon, which are also each rotationally movable and longitudinally movable. Through the interaction of the fastening clips with the compensating rail 2, a fastening device 1 having multiple degrees of freedom is provided, which is freely settable and adaptable.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A fastening device for lines in an engine compartment of a motor vehicle, the fastening device comprising:
    at least two fastening clips, one of the at least two fastening clips having a clip base for attachment in the engine compartment and at least one of the at least two fastening clips having a clip head for attachment to a line; and
    a compensating rail on which one or more fastening clips of the at least two fastening clips is situated and longitudinally movable, the one or more fastening clips comprising a fully rotatable fastening clip having a ball head that is enclosed by an area of the compensating rail.

2. The fastening device according to claim 1,
    wherein the area enclosing the ball head is formed from a first surface angled to a second surface with which the ball head is in contact,
    wherein the first surface and the second surface are configured to exert a force on the ball head so that friction surfaces are formed between the ball head and the first surface and the second surface of the area.

3. The fastening device according to claim 2, wherein the area enclosing the ball head is extended in one direction so that a trough is formed in which the one or more fastening clips is situated for longitudinal movement.

4. The fastening device according to claim 1,
    wherein the clip base has a spreading element to situate in a fastening point that is implemented as an undercut fastening recess,
    wherein the spreading element engages in the undercut fastening recess under pressure action on the clip base in the engine compartment.

5. The fastening device according to claim 1, wherein the clip head is formed from an essentially U-shaped clamp having an enclosure area pointing inward on ends of the essentially U-shaped clamp so that the line engages in the essentially U-shaped clamp upon pressure action.

6. The fastening device according to claim 1, wherein the compensating rail is flexible and bendable into a desired shape in the engine compartment.

7. The fastening device according to claim 1, wherein the at least two fastening clips are situated for rotation on the compensating rail.

8. The fastening device according to claim 1, wherein both of the at least two fastening clips are situated and longitudinally movable on the compensating rail.

9. The fastening device according to claim 1, further comprising a plurality of clip heads situated on the compensating rail.

10. The fastening device according to claim 1, wherein the compensating rail is bent over.

11. The fastening device according to claim 1, wherein the at least two fastening clips are configured for an air-conditioning system.

* * * * *